J. M. BRAGG.
TRAP.
APPLICATION FILED MAR. 12, 1917.
1,244,166.
Patented Oct. 23, 1917.
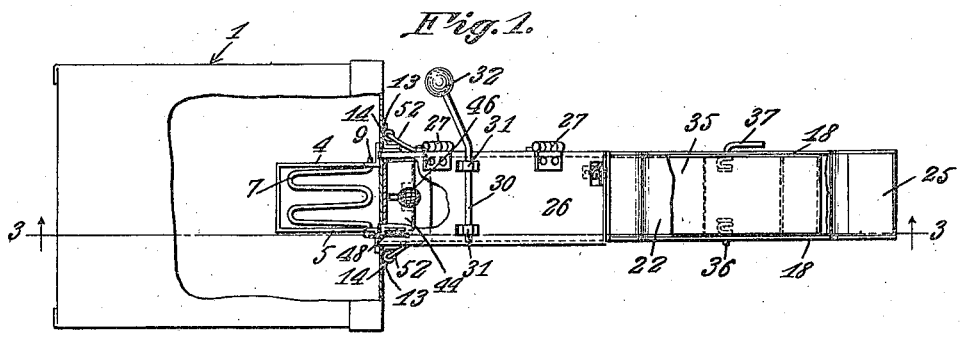
Fig. 1.
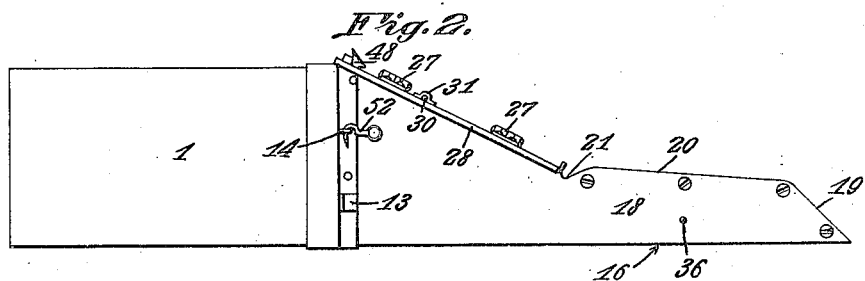
Fig. 2.
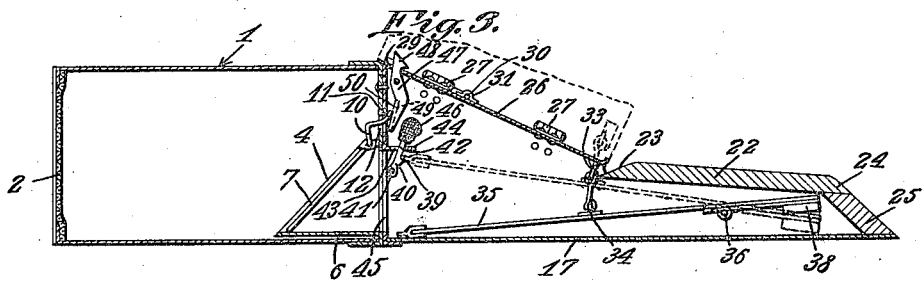
Fig. 3.
Fig. 4.
Fig. 5.
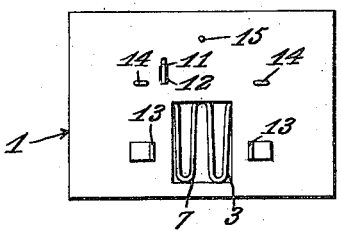
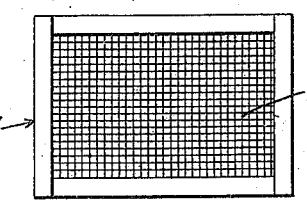
Jones M. Bragg, INVENTOR
WITNESSES
John M. Dobie
S. M. McColl
BY Richard B. Oliver
ATTORNEY

UNITED STATES PATENT OFFICE.

JONES M. BRAGG, OF ELECTRIC, NORTH CAROLINA.

TRAP.

1,244,166. Specification of Letters Patent. Patented Oct. 23, 1917.

Application filed March 12, 1917. Serial No. 154,332.

*To all whom it may concern:*

Be it known that I, JONES M. BRAGG, a citizen of the United States, residing at Electric, in the county of Stanly and State of North Carolina, have invented certain new and useful Improvements in Traps, of which the following is a specification.

This invention relates to improvements in traps, and more particularly to victim-set traps for rodents, in which the capture of an animal serves to set the trap for another animal.

The main object of the invention is to provide a trap of this character so constructed that it will be automatically set by the animal entering the impounding chamber.

Another object is to so construct such a trap that the opening of the door of the impounding chamber will operate to release the trapping door of the runway which is equipped to automatically open when so released and connected to set the trap by said opening.

Another object is to provide a trap of this character equipped with a tilting platform held by a bait carrying latch in set position which when an animal steps thereon and manipulates the bait, will be released and tilt downward thereby automatically closing the trap door behind him.

Another object is to provide a lock for the trap door which is released by the opening of the door of the impounding chamber.

Another object is to so construct the trap door that it will open with a minimum amount of exertion and be held in open position until closed.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a plan view of a trap constructed in accordance with this invention with parts broken out to show the interior arrangement, Fig. 2 is a side elevation thereof, Fig. 3 is a longitudinal section taken on the line 3—3 of Fig. 1, Fig. 4 is a front elevation of the impounding chamber with the runway removed, and Fig. 5 is a rear elevation thereof.

In the embodiment illustrated this improved trap comprises an impounding chamber 1 which may be constructed of any suitable material, preferably of galvanized iron, having a grating 2 at its rear end to provide for the admission of light and air.

The front end of this chamber 1 has an opening 3 therein from which, at opposite sides thereof, are formed guides 4 and 5 connected at their lower ends by a plate 6 which forms an entrance to the impounding chamber. The upper edges of these guides 4 and 5 are inclined downwardly and inwardly as shown clearly in Fig. 3 and an upwardly swinging door 7 is mounted therein and conforms in shape to the inclination of these guide members. This door 7 is preferably constructed of heavy wire here shown bent in the form of loops and having one end bent laterally and engaged with a bearing as shown at 9 while the other end thereof is bent laterally and then extended upwardly as shown at 10 with a finger 11 projecting laterally from the portion 10 through an opening 12 in the front wall of the chamber 1 and which is designed for a purpose to be described. It will be observed that this door 7 operates by gravity to drop into closed position and that it may be readily lifted owing to its construction of wire, by an animal forcing its head against it, such doors being common in traps of this character.

The passage between the guides 4 and 5 is preferably made comparatively narrow so that an animal entering through the opening 3 cannot turn around in said passageway and he must necessarily move forward thereby raising the door 7 and passing into the impounding chamber where he is trapped by the door 7 dropping into closed position behind him.

Projecting forwardly from the front wall of the chamber 1 on opposite sides of the door opening 3 therein are a pair of brackets as 13 which are here shown L-shaped in construction with one arm thereof soldered or otherwise secured to the outer front face of the chamber 1. These brackets 13 are designed to form a retaining means for preventing lateral movement of a runway to be used in connection with this chamber and which will be presently described.

Projecting forwardly from this front chamber wall at points above the brackets 13 and in a plane to one side thereof are two eyes 14 opening vertically and which are designed to receive hooks carried by the runway for detachably connecting it with the impounding chamber. A pin 15 projects from the front wall of the impounding chamber in a plane between the eyes 14 and above said eyes and the door opening 3 and which is designed as a centering and retaining device to assist in holding the runway now to be described.

The runway 16 which is used in connection with this impounding chamber 1 is constructed as shown clearly in Figs. 1, 2 and 3, of a bottom member or plate 17 having upstanding side walls 18 rising therefrom and preferably composed of sheet metal, although they may be composed of any other suitable material, said side walls being beveled downwardly and forwardly at their forward ends as shown at 19 and slightly inclined rearwardly from the inner end of said inclined front ends to a point about midway the length thereof as shown at 20. As shown, these side walls 18 are provided intermediately of their ends about midway thereof with notches 21 and from said notches the upper edges of these inclined walls are inclined abruptly upwardly and rearwardly to increase the depth of the runway from said notches to the rear terminal thereof. Disposed within the front end of these side walls 18 between the notches 21 thereof and their beveled front ends is a top closure 22 here shown constructed of wood but which may be of any other suitable material. This closure 22 has its rear end beveled downwardly and rearwardly as shown at 23 and its front end beveled downwardly and forwardly as shown at 24. An end closure 25 is arranged between said top closure 22 and the bottom plate 17 as is shown clearly in Fig. 3.

A door 26 is hinged at one side edge to the upper edge of one of the side walls 18 on the abruptly inclined portion thereof as shown at 27 and is provided on its free edge with a flange 28 which is adapted to fit down over the abruptly inclined edge of the other side wall 18 as is shown clearly in Fig. 2. This door 26 has an opening 29 in its rear end near the flanged edge thereof and which is designed for a purpose presently to be described. A rod 30 is pivotally mounted in transversely alined apertured ears 31 carried by the outer face of the door 26 and projects at one end beyond the rear hinged edge of the door, said projecting end being bent at an oblique angle and provided at its terminal with a weight 32 which assists in opening the door and in retaining it in open position. This door 26 is provided at its lower hinged corner with an inwardly extending apertured lug 33 which is connected by a link 34 with a tilting platform 35 and by means of which said door is closed on the downward tilting of the rear end of the platform and which provides for the opening of the door when the platform is raised as will be hereinafter more fully described.

This platform 35 is fixed intermediately of its ends, preferably nearer its front end to a pintle 36, the ends of which project beyond the side edges of said platform and are pivotally mounted in the side walls 18 of the runway as is shown clearly in Figs. 1, 2 and 3. This pintle 36 has one end projecting beyond one side wall of the runway and bent to form an actuating handle 37 by means of which the platform may be set as will be presently described. This platform has a weight 38 secured to its front end preferably on its lower face as shown in Fig. 3 and which is designed to assist in balancing the platform.

The rear end of this platform 35 has a longitudinally extending lip 39 which is designed to be engaged when the trap is set with a latch 40, said latch being pivotally mounted on a rod 41 journaled in the side walls 18 at their rear ends. This latch 40 has an upwardly projecting finger 42 which extends through a slot 43 in a rearwardly projecting lateral flange 44 carried by the rear wall of the runway above an outlet opening 45 therein. It is to be understood and is clearly shown in Fig. 3 that this outlet opening 45 registers with the opening 3 in the impounding chamber when the runway is in operative position in relation thereto. A bait holder 46 is carried by the upper end of the finger 42 and may be of any suitable or desired construction, being here shown in the form of a screen wire casing designed to protect the bait and while enticing the animal into the trap will prevent him from carrying off or eating the bait.

The odor is sufficient to tempt him to enter and when he endeavors to secure the bait he will force the latch 40 away from lip 39 of the platform 35 thereby disengaging said platform which, under the weight of the animal will move downwardly to the bottom of the runway. This downward movement of the rear end of the platform will cause the door 26 to be automatically closed owing to the linked connection between it and said platform and the rat or other animal which has caused this tilting of the platform will be trapped within the runway with its head directed toward the opening 3 in the impounding chamber. The natural course for the animal to follow will be to move forward into the passage formed by the guides 4 and 5 of the impounding chamber and during this movement raise the door 7 which will permit him to enter the chamber 1, and after it has passed through the door it will drop by gravity into closed position and prevent his return.

A locking device for the door 26 is shown in the form of a catch member 47 pivoted on one side wall 18 of the runway adjacent its upper rear end. This catch is pivoted intermediately of its ends with its door engaging nose 48 projecting through the opening 29 in said door and which is designed to hook over the front wall of said opening and lock the door in closed position. This catch 47 has a depending tail portion 49 provided with a laterally extending flange 50, which latter is disposed opposite an opening 51 in the rear wall of the runway above the door opening therein, said opening being designed to register with the opening 12 in the front wall of the impounding chamber when the parts are assembled. The finger 11 of the door 7 of the impounding chamber projects through said registering openings 12 and 51 and is designed to engage the flange 50 on the tail portion of the catch 47 so that when door 7 is swung upwardly by the entrance of the rodent into the impounding chamber, this finger 11 will move forwardly against the flange 50 and thereby swing catch 47 to release the nose 48 thereof from the door 26, and this door 26 under the action of weight 32 will then swing automatically upward into open position carrying with it the platform 35 until the lip 39 thereof is again engaged with the latch 40 and the trap will thus be again set ready for the next animal.

From the above description it will be understood that when this runway 16 is placed in operative relation with the impounding chamber 1, the side walls 18 thereof will be positioned between the projecting brackets 13 on the front face of said impounding chamber and will be held by said brackets against lateral movement while the pin 15 entering the aperture in the rear wall of said runway, as shown in Fig. 3, will assist in retaining the runway in operative position on the impounding chamber. Hooks 52 carried by the side walls of the runway at its rear end are then engaged with the eyes 14 on the impounding chamber and the two parts of the trap will be ready for use. The catch 47 is then disengaged from the door 26 and said door will swing automatically upward under the action of weight 32 into open position, carrying the platform 35 with it and setting the platform by causing the lip 39 thereof to engage with the latch 40 which carries the bait holder 46. When a rat or other animal smells the bait he will be induced to enter the runway over the top member 22, and when he steps on to the rear end of the platform 35 and approaches the bait, the odor thereof will cause him to try and obtain access thereto, and the manipulation of the holder 46 will operate to release latch 40 from the lip 39 of the platform, which latter, under the weight of the animal will drop downwardly carrying him with it into the runway and closing the door 26 after it. The door is caused to close by the link connection of the platform 35 as hereinbefore described. The rat will then enter the impounding chamber in the manner above described whereby the trap will be again set ready for the next operation.

The runway and impounding chamber are preferably detachably connected in the manner above described to permit them to be separated for cleaning, repairing and other purposes.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

1. An animal trap comprising an impounding chamber and a trapping chamber communicating with each other, a closure for said trapping chamber, a platform pivotally mounted intermediately of its ends in said trapping chamber, a latch for holding said platform against tilting movement, a connection between said platform and said closure whereby the platform is raised on the opening of the closure and the closure closed on the lowering of the platform, a catch for holding said closure in closed position, and means operable by the entrance of an animal into said impounding chamber to release said catch, said platform latch being releasable by manipulation of the animal before entering the impounding chamber.

2. The combination with an impounding chamber having an opening in its front wall with an upwardly opening closure therefor pivotally mounted within said chamber, said closure having a finger projecting through the front wall of said chamber, a runway disposed in front of said chamber and communicating therewith, a closure for said runway, a catch for normally holding said closure in closed position, said catch having means projecting into the path of said finger whereby the catch is released on the opening of said chamber door, a platform mounted for tilting movement within said runway, means for normally holding said platform against tilting movement, means for automatically opening said runway closure on the release of said catch, and a connection between said closure and said platform whereby the platform is raised on the opening of the closure and the closure closed on the lowering of the platform.

In testimony whereof I affix my signature in presence of two witnesses.

JONES M. BRAGG.

Witnesses:
W. T. CARTER,
C. J. JOHNSON.

Copies of this patent may be obtained for five cents each, by addressing the "Commissioner of Patents, Washington, D. C."